United States Patent [19]

Smutny

[11] Patent Number: 4,857,570

[45] Date of Patent: Aug. 15, 1989

[54] STABILIZED POLYMERS

[75] Inventor: Edgar J. Smutny, Houston, Tex.

[73] Assignee: Shell Oil Company, Houston, Tex.

[21] Appl. No.: 198,549

[22] Filed: May 24, 1988

[51] Int. Cl.$^4$ .......................... C08K 5/15; C08K 5/09
[52] U.S. Cl. .................................... 524/112; 524/321
[58] Field of Search ................................ 524/112, 321

[56] References Cited

U.S. PATENT DOCUMENTS

| | | | |
|---|---|---|---|
| 2,495,286 | 1/1950 | Brubaker | 260/63 |
| 3,558,541 | 1/1971 | Dalton | 524/321 |
| 3,694,412 | 9/1972 | Nozaki | 260/63 |
| 4,415,690 | 11/1983 | Grimm | 524/112 |

FOREIGN PATENT DOCUMENTS

| | | | |
|---|---|---|---|
| 121965 | 8/1984 | European Pat. Off. . | |
| 181014 | 5/1986 | European Pat. Off. . | |
| 1814370 | 6/1969 | Fed. Rep. of Germany | 524/112 |
| 1081304 | 3/1965 | United Kingdom . | |
| 1029190 | 5/1966 | United Kingdom | 524/321 |

*Primary Examiner*—Veronica P. Hoke

[57] ABSTRACT

The melting point and the apparent degree of crystallinity of a linear alternating polymer of carbon monoxide and at least one ethylenically unsaturated hydrocarbon are stabilized against undue lowering by intimately mixing with the polymer a succinic anhydride or hydrolysis product thereof.

27 Claims, No Drawings

STABILIZED POLYMERS

FIELD OF THE INVENTION

This invention relates to stabilized linear alternating polymers of carbon monoxide and at least one ethylenically unsaturated hydrocarbon. More particularly, the invention relates to mixtures of the linear alternating polymers and certain carboxylic acid anhydrides or hydrolysis product thereof, which mixtures demonstrate improved melt processing satbility during procedures which involve melting and subsequent solidification of the polymer.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. U.K. 1,081,304 disclosed the production of related polymers of increased carbon monoxide content in the presence of alkylphosphine complexes of palladium salts as catalysts. Nozaki extended this process through the use of arylphosphine complexes of palladium salts and certain inert solvents, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest, in part because of the greater availability of such materials. These polymers, often referred to as polyketones or polyketone polymers, have been shown to be of the repeating formula —CO—(A)— where A is the moiety of ethylenically unsaturated hydrocarbon polymerized through the ethylenic linkage. For example, when the polymer is a copolymer of carbon monoxide and ethylene, the polymer is represented by the repeating formula

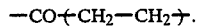

A preferred general process for the production of these linear alternating polymers is illustrated by a number of published European patent applications including 0,121,965 and 0,181,014. The process generally involves a catalyst composition formed from a Group VIII metal selected from palladium, cobalt or nickel, the anion of a non-hydrohalogenic acid having a pKa below 2 and a bidentate ligand of phosphorus, arsenic or antimony. The resulting polymers are relatively high molecular weight thermoplastic polymers having utility in the production of structural articles such as containers for food and drink and parts for the automotive industry.

The polymers are characterized by relatively high melting points, frequently over 200° C. A melting point of this magnitude is of value in many applications, particularly when a shaped article is to be subjected to conditions of elevated temperature. However, when a polyketone polymer is subjected to the high temperatures required for melt processing, chemical changes can occur such as crosslinking, chain scission and formation of undesirable degradation products which can cause loss of attractive physical properties. These changes are particularly apparent in the melting point and the percentage of crystallinity versus amorphous polymer as measured by differential scanning calorimetry (DSC). It is desirable that polyketone compositions should not undergo extensive changes in physical properties during melt processing procedures. Stabilization of the percent crystallinity and melting point of the polymer is an indication of stabilization of other physical properties.

It would be of advantage to provide polyketone compositions whose melting point is relatively constant throughout one or more melt processing operations. It would be of advantage to provide polyketone compositions whose percent crystallinity has been stabilized against loss during melting-solidification of the polymer composition.

SUMMARY OF THE INVENTION

It has now been found that compositions comprising linear alternating polymers of carbon monoxide and at least one ethylenically unsaturated hydrocarbon exhibit improved melt processability as evidenced by an apparent crystallinity which has been stabilized against loss when mixed with certain cyclic carboxylic acid anhydrides or hydrolysis product thereof. It has been found that polyketone compositions comprising polyketone polymer and certain succinic anhydrides or hydrolysis product thereof exhibit stability of apparent crystallinity and relative stability of melting point through one or more melt processing operations which incorporate the melting and subsequent solidification of the polymer composition.

DESCRIPTION OF THE INVENTION

The polymers which are employed in the compositions of the invention are the linear alternating polymers of carbon monoxide and at least one ethylenically unsaturated hydrocarbon. Suitable ethylenically unsaturated hydrocarbons for use as precursors of the polymers have up to 20 carbon atoms inclusive, preferably up to 10 carbon atoms inclusive, and are aliphatic hydrocarbons such as ethylene as well as other α-olefins including propylene, butene-1, octene-1 and dodecene-1, or are arylaliphatic containing an aryl substituent on an otherwise aliphatic molecule, particularly an aryl substituent on a carbon atom of the ethylenic unsaturation. Illustrative of this latter class are styrene, p-methylstyrene, p-ethylstyrene and m-methylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the preferred polymer is that of a linear alternating polymer of carbon monoxide and unsaturated hydrocabon, e.g., ethylene or ethylene and propylene, and will contain substantially one carbon monoxide moiety for each moiety of unsaturated hydrocarbon. When terpolymers of carbon monoxide and ethylene and a second ethylenically unsaturated hydrocarbon are produced, there will be within the polymer at least about 2 units incorporating a moiety of ethylene for each unit incorporating a moiety of the second hydrocarbon. Preferably there are about 10 to about 100 units incorporating a moiety of ethylene per unit incorporating a moiety of the second hydrocarbon within the polymer. The polymer chain of the preferred class of polymers is therefore represented by the formula

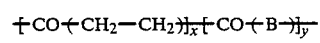

wherein B is the moiety of the second ethylenically unsaturated hydrocarbon of at least 3 carbon atoms polymerized through the ethylenic unsaturation. The

units and the

units occur randomly throughout the polymer chain and the ratio of y:x is no more than about 0.5. In the modification of the invention which employs copolymers of carbon monoxide and ethylene without the presence of a second hydrocarbon, the polymers are represented by the above formula wherein y=0. When y is other than 0, i.e., terpolymers are employed, ratios of y:x from about 0.01 to about 0.1 are preferred. The end groups or "caps" of the polymer chain will depend on what materials are present during the production of the polymer and whether and how the polymer has been purified. The precise nature of the end groups is of little significance with regard to the overall properties of the polymer so that the polyketone polymer is fairly represented by the above formula. Of particular interest are those polymers of molecular weight from about 1,000 to about 200,000, especially those of molecular weight from about 10,000 to about 50,000. The physical properties of such polymrs depend in part on whether the polymer is a copolymer or a terpolymer, the proportion of the second hydrocarbon present in the case of terpolymers and upon the molecular weight. Typical melting points of the polyketone polymers are from about 175° C. to about 300° C., more frequently from about 210° C. to about 270° C. The polymers have a limiting viscosity number (LVN) of from about 0.5 to about 10 as measured in m-cresol at 60° C. in a standard capillary viscosity measuring device. Preferred polymers have a LVN from about 0.8 to about 4, more preferably from about 1.1 to about 2.5.

A method of producing the polyketone polymers which is now becoming conventional is to contact the carbon monoxide and hydrocarbon(s) in the presence of a catalyst composition formed from a palladium compound, the anion of a non-hydrohalogenic acid having a pKa below about 6 and a bidentate ligand of phosphorus. The scope of the process for the production of the polyketone polymers is extensive but, without wishing to be limited, a preferred palladium compound is a palladium carboxylate, particularly palladium acetate, the preferred anion is the anion of trifluoroacetic acid or p-toluenesulfonic acid and the preferred bidentate ligand is 1,3-bis-(diphenylphosphino)propane or 1,3-bis[di(2-methoxyphenyl)phosphino]propane. Such a process is illustrated by copending U.S. patent application Ser. No. 930,468 filed Nov. 14, 1986.

Polymerization is conducted under polymerization conditions in the gaseous phase or in a liquid phase in the presence of a reaction diluent such as an alkanol, e.g., methanol or ethanol. The reactants are contacted by conventional methods as by shaking or stirring. Suitable reaction temperatures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polymer product may contain residues of the catalyst which are removed, if desired, by contacting with a solvent or a complexing agent which is selective for the residues.

The compositions of the invention comprise an intimate mixture of the polyketone polymer and certain cyclic acid anhydride or hydrolysis product thereof. The precise form of the acidic species present in the final composition is not known with certainty and may depend upon a number of factors including the degree of moisture in the polymer with which the acid anhydride is mixed, whether or not the composition has been exposed to moisture as by contact with a humid environment, the temperature to which the polymer composition has been raised and the number of times the composition has been thermally processed. It is known that the acid anhydrides are quite sensitive to moisture so that unless substantial precautions are taken to insure that the composition remains dry, the acid anhydride will hydrolyze, probably to species containing carboxylic acid moieties. However, when the stabilizer is provided in the form of a carboxylic acid anhydride whether hydrolysis takes place or not is not considered to detract from the advantages of stabilization of the polymer.

The cyclic anhydride employed in the stabilized compositions of the invention is a succinic anhydride with up to 2 hydrocarbyl substituents independently of up to 20 carbon atoms inclusive. Illustrative of such succinic anhydrides are those of the formula

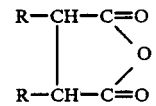

wherein R independently is hydrogen, alkyl of up to 20 carbon atoms inclusive or alkenyl of up to 20 carbon atoms inclusive.

Illustrative of such succinic anhydrides are succinic anhydride, methylsuccinic anhydride, propylsuccinic anhydride, 3,4-dimethylsuccinic anhydride, octenylsuccinic anhydride, dodecylsuccinic anhydride, isohexenylsuccinic anhydride, octadecylsuccinic anhydride and decylsuccinic anhydride. In general, the succinic anhydrides of the above formula wherein one R is hydrogen and the other R is alkyl or alkenyl of from 12 to 18 carbon atoms inclusive are a preferred class of stabilizers considered together with hydrolysis product thereof.

The succinic ahydrides of the above formula are known in the art and conventional. Some are commercially available, for example, from Scientific Polymer Products Inc. The long chain alkyl or alkenyl succinic anhydrides are produced by alkylation or alkenylation of maleic anhydride with an olefin in the presence of a catalyst as disclosed, for example, in U.S. Pat. No. 4,388,471, published U.K. patent applications 356,882, 2,081,274 and 1,480,453, U.S. Pat. No. 3,935,249, U.S. Pat. No. 3,953,475 and U.S. Pat. No. 4,599,433.

The amount of the succinic anhydride or hydrolysis product to be employed is a stabilizing quantity. Amounts of anhydride or hydrolysis product from about 0.01% by weight to about 10% by weight based on the total composition are satisfactory with quantities from about 0.05% by weight to about 1% by weight on the same basis being preferred.

The method of mixing the polyketone polymer and the succinic anhydride is not critical so long as an intimate mixture is obtained. In one modification, the polymer in a finely divided form is mixed with the succinic anhydride powder and the resulting mixture is passed through an extruder to obtain the mixture as an extrudate. In an alternate modification the mixture is produced in a mixing device enhibiting high shear. Whatever the ultimate acidic anhydride species in the composition might be, the anhydride species is preferably provided to the composition as the succinic anhydride.

The resulting compositions will have an improved melt processability as evidenced by a relatively constant apparent crystallinity and relatively constant melting points and crystallization temperatures, as well as by relatively constant high heats of crystallization when subjected to melt processing operations of melting and solidification. Retention of an apparent crystallinity during melt processing indicates that the crystallinity of a polymer composition subsequent to processing is not significantly lower than the crystallinity prior to melt processing. Polymers which are not stabilized against loss of apparent crystallinity exhibit melting points, crystallization temperatures and heats of crystallization which decrease, in some cases substantially decrease, upon melt processing. This decrease of melting point and crystallization temperature, although possibly due to a number of factors, is a measure of the loss of apparent crystallinity with the magnitude of the temperature decrease being some measure of the loss of apparent crystallinity. A decrease in heat of crystallization upon melt processing is a more direct measure of loss of apparent crystallinity.

This improvement in melt processability, as evidenced by stability of apparent crystallinity and relatively constant melting points, offers considerable advantages which are not to be found in unstabilized polymers. For example, a stabilized polymer composition may be converted into nibs by the use of an extruder. The nibs are then suitably injection molded to produce an article without substantial decrease in melting point of the polymeric composition. The compositions of the invention are particularly useful in this and other instances where melt processing to the desired product requires a series of melting and solidification cycles. While the compositions are usefully processed by conventional techniques which do not require melting and solidification of the polymer, the advantages of the compositions are most apparent when melt processing operations which do involve melting and solidification of the polymer are employed.

The compositions of the invention stabilized against loss of apparent crystallinity may optionally contain other conventional additives which do not serve to unnecessarily reduce the melting point or apparent degree of crystallinity. Such additives include antioxidants, stabilizers, blowing agents, mold release agents, colorants or reinforcements which are added to the polymer by blending, milling or other conventional methods prior to, subsequent to or together with the succinic anhydride.

The compositions of the invention are useful for the variety of applications of a premium thermoplastic as is now known in the art. The compositions are particularly useful in the production of articles by conventional methods which typically require one or more melting-solidification cycles in their production. Illustrative of such articles are containers for food and drink, shaped parts for the automobile industry, wires and cables and structural articles for construction applications.

The invention is further illustrated by the following Illustrative Embodiments which should not be construed as limiting the invention.

PROCEDURE

In the following Illustrative Embodiments II and III, measurements of melting points and crystllization temperatures, or alternatively heats of melting and heats of fusion, were made by the use of a Perkin-Elmer DSC 7 differential scanning calorimeter (DSC) which employs samples of polymer or polymer composition in sealed pan containers. The pan and contents are heated at a controlled rate, typically 20° C./minute, until the temperature at which the sample has melted, $Tm_1$. The pan and contents are then cooled until the sample has solidifed ($Tc_1$) and then heated, past a second melting point ($Tm_2$), to 285° C. at which temperature the sample is maintained for 10 minutes. The pan and contents are then cooled until the sample has solidified a second time ($Tc_2$). The melting and crystallization temperatures are defined as the temperatures at which the heat flow reaches a maximum (for melting) or a minimum (for crystallization). Typically the melting point, Tm, will be higher than the crystallization temperature, Tc. Although a number of factors influence the melting point and crystallization temperature, these values are also influenced by the crystallinity of the polymer. In general, the smaller the difference between the first and second melting points, the greater the degree of retained crystallinity. The same relationship is generally true for the crystallization temperatures.

It is also possible to determine through the use of the DSC the magnitude of the first and second heats of melting ($H_1$ and $H_2$) and the first and second heats of crystallization ($C_1$ and $C_2$) for the polymer without aluminum tri-alkoxide and also for the stabilized polymer composition. In general, the heats of crystallization for the stabilized composition will be higher than the corresponding values for the unstabilized polymer. The greater this difference is, the greater the degree of crystallinity which has been retained in the polymeric composition.

In the Illustrative Embodiments, temperatures are measured in °C. and heats are measured in cal/g.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. This polymer had a melting point of 220° C. and a limiting viscosity number (LVN) of 1.96 measured in m-cresol at 60° C.

ILLUSTRATIVE EMBODIMENT II

A blend of the terpolymer of Illustrative Embodiment I and 1% of succinic anhydride was produced by placing appropriate quantities of the terpolymer in a finely divided state and succinic anhydride in methanol in a plastic bottle and tumbling the mixture overnight at ambient temperature. The mixture was then dried and solvent was removed by placing in a vacuum oven at 50° C. for 18 hours. The resulting dry mixture was extruded through a 15 mm twin screw Baker Perkins extruder in air. The resulting blend was termed Sample A. In like fashion were produced a blend of the terpolymer and a hexadecenylsuccinic anhydride, Sample B, and a blend of the terpolymer and an alkenylsuccinic anhydride wherein the alkenyl substituent is a mixture of $C_{15}$ to $C_{19}$ alkenyl groups, Sample C. Also evaluated were a sample of the terpolymer which had been tumbled with acetone and extruded, Sample D, and a sample of the terpolymer which had been extruded without the overnight contact with solvent, Sample E.

The samples were evaluated by the DSC technique described above. The results are shown in Table I.

TABLE 1

| Sample | $Tm_1$ | $Tc_1$ | $Tm_2$ | $Tc_2$ | $C_1$ | $C_2$ | $H_1$ | $H_2$ |
|---|---|---|---|---|---|---|---|---|
| A | 218 | 172 | 212 | 152 | 15.1 | 12.0 | 19.6 | 16.4 |
| B | 214 | 167 | 210 | 151 | 15.8 | 11.4 | 19.3 | 17.2 |
| C | 214 | 166 | 208 | 144 | 15.9 | 11.3 | 18.3 | 16.6 |
| D | 217 | 169 | 210 | 156 | 14.6 | 10.0 | 17.4 | 16.6 |
| E | 223 | 172 | 216 | 158 | 16.1 | 13.9 | 18.0 | 18.7 |

Temperatures are measured in °C. and heats are measured in cal/g.

What is claimed is:

1. A composition stabilized against the loss of apparent crystallinity during melt processing which comprises a linear alternating polymer of carbon monoxide and at least one ethylenically unsaturated hydrocarbon and a stabilizing quantity of a succinic anhydride or hydrolysis product thereof.

2. The composition of claim 1 wherein the polymer is represented by the formula

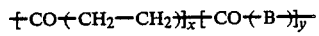

wherein B is the moiety of an ethylenically unsaturated hydrocarbon of at least 3 carbon atoms polymerized through the ethylenic unsaturation, and the ratio of y:x is no more than about 0.5.

3. The composition of claim 2 wherein the ethylenically unsaturated hydrocarbon of at least 3 carbon atoms is propylene.

4. The composition of claim 3 wherein the succinic anhydride is represented by the formula

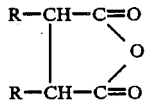

wherein R independently is hydrogen, alkyl of up to 20 carbon atoms inclusive or alkenyl of up to 20 carbon atoms inclusive.

5. The composition of claim 4 wherein the succinic anhydride is a succinic anhydride of one alkyl or alkenyl group.

6. The composition of claim 5 wherein y is 0.

7. The composition of claim 5 wherein the ratio of y:x is from about 0.01 to about 0.1.

8. The composition of claim 7 wherein the alkyl or alkenyl succinic anhydride is alkyl succinic anhydride of from 12 to 18 carbon atoms inclusive in the alkyl.

9. The composition of claim 8 wherein the alkyl is dodecyl.

10. A process of stabilizing a linear alternating polymer of carbon monoxide and at least one ethylenically unsaturated hydrocarbon against loss of apparent crystallinity during melt processing by incorporating in the polymer a stabilizing quantity of a succinic anhydride or hydrolysis product thereof.

11. The process of claim 10 wherein the linear alternating polymer is represented by the formula

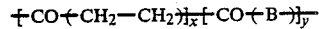

where B is the moiety of an ethylenically unsaturated hydrocarbon of at least 3 carbon atoms polymerized through the ethylenic unsaturation and the ratio of y:x is no more than about 0.5.

12. The process of claim 11 wherein the carboxylic acid anhydride is represented by the formula

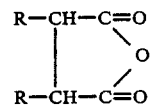

wherein R independently is hydrogen, alkyl of up to 20 carbon atoms inclusive or alkenyl of up to 20 carbon atoms inclusive.

13. The process of claim 12 wherein B is a moiety of propylene.

14. The process of claim 13 wherein the carboxylic acid anhydride is an alkyl or alkenyl succinic anhydride.

15. The process of claim 14 wherein y is 0.

16. The process of claim 14 wherein the ratio of y:x is from about 0.01 to about 0.1.

17. The process of claim 16 wherein the alkyl or alkenyl succinic anhydride is an alkyl succinic anhydride of from 12 to 18 carbon atoms inclusive in the alkyl.

18. The process of claim 17 wherein the alkyl is dodecyl.

19. A method of retaining a relatively high apparent crystallinity of a linear alternating polymer of carbon monoxide and at least one ethylenically unsaturated hydrocarbon during melt processing of the polymer by (1) incorporating within the polymer, prior to melt processing, a stabilizing quantity of a succinic anhydride or hydrolysis product thereof, (2) melt processing the resulting polymer composition, and (3) recovering, upon solidification, polymer of relatively unreduced apparent crystallinity.

20. The method of claim 19 wherein the linear alternating polymer is represented by the formula

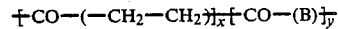

wherein B is the moiety of an ethylenically unsaturated hydrocarbon of at least 3 carbon atoms polymerized through the ethylenic unsaturation and the ratio of y:x is no more than about 0.5.

21. The method of claim 20 wherein the carboxylic acid anhydride is represented by the formula

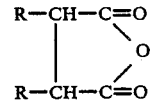

wherein R independently is hydrogen, alkyl of up to 20 carbon atoms inclusive or akenyl of up to 20 carbon atoms inclusive.

22. The method of claim 21 wherein B is a moiety of propylene.

23. The method of claim 22 wherein the carboxylic acid anhydride is an alkyl or alkenyl succinic anhydride.

24. The method of claim 23 wherein y=0.

25. The method of claim 23 wherein the ratio of y:x is from about 0.01 to about 0.1.

26. The method of claim 25 wherein the alkyl or alkenyl succinic anhydride is an alkyl succinic anhydride of from 12 to 18 carbon atoms inclusive in the alkyl.

27. The method of claim 26 wherein the alkyl is dodecyl.

* * * * *